United States Patent [19]

Hallenbeck

[11]  4,325,852

[45]  Apr. 20, 1982

[54] INSIDE TIRE PAINT

[75] Inventor: Victor L. Hallenbeck, Brecksville, Ohio

[73] Assignee: The B. F. Goodrich Company, Akron, Ohio

[21] Appl. No.: 136,007

[22] Filed: Mar. 31, 1980

[51] Int. Cl.³ .............................................. C08L 91/00
[52] U.S. Cl. ................................... 523/334; 260/718; 260/745; 523/326; 524/276; 524/277
[58] Field of Search ................... 260/28.5 B, 745, 718, 260/23.7 N, 23.7 M

[56]  References Cited

U.S. PATENT DOCUMENTS 3,644,130  2/1972  Evans et al. ................... 260/28.5 B
3,923,712  12/1975  Vickery ......................... 260/33.4 R Primary Examiner—Melvyn I. Marquis
Attorney, Agent, or Firm—Joe A. Powell

[57] ABSTRACT

An inside green tire paint is provided which is a water based paint. The paint is substantially free of silicone and hydrocarbon solvents. The paint composition comprises (a) rubber latex, (b) wax dispersion, (c) water, (d) wetting agent, and (e) air bleeding pigment.

4 Claims, No Drawings

INSIDE TIRE PAINT

BACKGROUND OF THE INVENTION

In the production of pneumatic tires, it is conventional practice to mold the uncured (commonly referred to as the "green") tire in a molding press in which the tire is pressed outwardly against an outer mold. The green tire is pressed outwardly to mold the tread pattern and shape the sidewalls. The green tire is pressed outwardly by means of a rubber curing bladder which is sequentially pressurized with low pressure steam, followed by high pressure steam or hot water. The bladder is pressed against the inside of the tire for a time sufficient to vulcanize the rubber tire. Once the tire is vulcanized, the pressure in the bladder is reduced and the bladder collapses away from the tire. The tire is then removed from the molding press.

Before a tire is loaded in a curing press, the inside surface of the tire is coated with what is normally referred to as an "inside green tire paint". One of the principle functions of the inside green tire paint is to act as a lubricant between the tire inner liner and the curing bladder both during the loading or shaping stage and the stripping stage of the molding operation. Lubricity is particularly needed during inflation of the bladder in the shaping stage because there is a substantial relative movement between the contacting surfaces of the bladder and the tire inner liner. Unless there is adequate lubrication provided between the tire and inner liner, there is a tendency for the bladder to buckle, which may result in misshaping of the tire and consequent rejection of the tire. At the end of the molding operation when the bladder is collapsed and the tire is stripped from the bladder, there is again considerable relative movement between the contacting surfaces of the bladder and the now cured tire inner liner. Unless adequate lubrication is provided between the bladder and inner liner, the bladder tends to stick to the tire. This causes excessive wear and roughening of the bladder, which results in reduced bladder life. When the bladder sticks to the tire, it also may cause a delay in the molding operation.

Another of the principal functions of the inside green tire paint is to avoid entrapment of major air bubbles between the tire inner liner and the bladder at the beginning of the shaping operation and to promote entry of air between the bladder and the tire inner liner at the end of the molding operation to avoid adhesion of the tire inner liner to the bladder when the bladder is evacuated prior to withdrawal from within the tire. The entrapment of air between the bladder and the inner liner and failure of the liner to separate from the bladder on evacuation of the bladder at the end of the molding cycle may both lead to such severe defects in the molded tire as to require it to be rejected.

The inside green tire paints commonly used heretofore in the rubber industry and more particularly the tire industry, are compositions containing a hydrocarbon solvent and silicone. U.S. Pat. No. 3,507,247 discloses a typical prior art inside green tire paint composition consisting of ground mica, clay, alcohol, water and silicone, with gasoline as a diluent.

Silicone, although a very effective release agent, can cause defects in the rubber article. If during the vulcanization process, the rubber flows and folds over on itself, then the silicone will prevent the surfaces from adhering. For this reason, it would be desirable if silicone could be eliminated from the inside green tire paints.

Hydrocarbon solvents, such as gasoline, have been used for years as the diluent in these paints. Because of environmental regulations and the cost of hydrocarbon solvents, it would also be desirable to remove them from the inside green tire paints.

SUMMARY OF THE INVENTION

It is an object of the present invention to provide an effective inside green tire paint.

It is a further object of the present invention to provide a green tire paint composition which does not contain silicone or a hydrocarbon diluent.

These and other objects, which will become evident from the subsequent description, are achieved by employing as an inside green tire paint a composition comprising (a) rubber latex, (b) wax dispersion, (c) water, (d) wetting agent, and (e) at least one pigment capable of functioning as an air bleeding agent.

DETAILED DESCRIPTION

The first necessary ingredient of the novel inside green tire paint is a rubber latex. The rubber latex serves the purpose of reducing flaking of the paint from the cured and uncured tire. The rubber latex acts as a binder which keeps the paint on the tire. Paint flaking can be a serious problem especially when the paint comes off the inside of the tire as it is being removed from the mold. The paint will fall into the tire mold and cause the mold to become dirty and also cause defects in the subsequent cured tire.

The type of rubber latex used can vary, however, natural rubber later is preferred with styrenebutadiene latex next preferred. Other types of rubber latex or a blend of more than one latex may be used.

The second necessary ingredient of the inside green tire paint of this invention is a wax dispersion. In the prior art paints, silicone serves the function of allowing the bladder to slip on the surface of the tire as the tire is being shaped into the mold. The wax dispersion serves a similar function to silicone. Wax, being more compatible with rubber than silicone, does not interfere with liner splice adhesion as does silicone.

The type and amounts of wax used in the wax dispersion are critical in this invention to making a satisfactory inside green tire paint. For example, if a very low melting wax were to be used, then the wax would melt as soon as the hot bladder contacts the inside surface of the tire. The melted wax could form puddles and smear thereby resulting in a defective tire. In the opposite situation, where the wax has too high a melting point, there would not be enough softening of wax as the hot bladder touches the tire and therefore the bladder would not slip on the inside surface of the tire.

In addition to the melting or softening point of the wax being important, another critical feature is the compatibility of the wax with the rubber it coats. Waxes which are very compatible with the rubber, will during the vulcanization of the tire, migrate into the tire's rubber innerliner. If this occurs, then the bladder will stick to the inside of the tire during the tire removal process. This can cause time delays in the tire curing operation as well as result in deformed tires.

It was found, quite unexpectedly, that a blend of more than one wax achieved the desired result. The preferred wax dispersion comprises three different waxes. Two of the three are paraffin type waxes and the third is carnauba wax. The two paraffin waxes have different melting points (55° C. and 72° C.). The carnauba wax has a melting point of 82° C. The lower melting paraffin waxes serve the function of providing slip between the bladder and tire during the shaping operation while the less compatible carnauba wax serves as a release between tire and bladder at the end of the vulcanization cycle. The ratio of paraffin to carnauba wax will vary depending on the type of tires being vulcanized. The larger the tire, the higher the proportion of carnauba should be. This is because the larger the tire, the longer it will be in the mold to vulcanize and therefore, the more the paraffin wax would migrate into the rubber.

In order for the inside green tire paint to function effectively over a wide range of tire types and sizes, the carnauba portion of the wax should be more than about 6 to less than about 50 percent by weight of the total weight of wax. Preferably, the carnauba wax will constitute from 20 to 30 percent of the total amount of wax. The remainder of the wax portion is paraffin. The melting point of paraffin wax used is dependent upon the type and size of tire to be coated and the level of carnauba wax used. A particularly desirable ratio has been found to be 25 carnauba, 25 paraffin (72° C.), and 50 paraffin (50 C.).

The ratio of and type of waxes used will also vary depending upon the type of vulcanizing equipment used. For example, when using a vulcanizing press which does not have a center post such as an autoform, more slip is required and therefore a large proportion of paraffin wax should be used. Whereas, a Bag-O-Matic type vulcanizing press requires less slippage between bladder and tire and therefore less paraffin can be used and more carnauba.

In addition to the wax, the wax dispersion contains water, a dispersing system such as soap, and a surfactant. Although commercially available soaps may be used to make the wax dispersion, it has been found that the soap can be made in situ by using a fatty acid such as oleic, stearic, or lauric acid and the like and an amine such as monoethanolamine.

The third necessary ingredient of the novel inside green tire paint is a pigment capable of functioning as an air bleeding agent. Examples of pigments which are capable of functioning as air bleeding agents are mica, talc, carbon black, and the like. Mica has been found to be an especially desirable pigment to use as an air bleeding agent.

The inside green tire paints of this invention also contain water as the carrier. Water is present in the rubber latex, wax dispersion and as free water added. The prior art paints commonly use hydrocarbon solvents such as gasoline as the carrier. By using a water-based paint, harmful vapors are eliminated and precious natural resources are conserved. The paints of this invention also contain a surfactant to aid in dispersing the ingredients in water.

The paints of this invention may contain other nonessential ingredients for coloring or identification purposes. The addition of nonessential ingredients for various purposes will become evident to those skilled in the art without departing from the scope of this invention.

The paints of this invention are easily produced by first making the wax dispersion. The wax dispersion is made by first melting the waxes. The waxes are heated to a temperature slightly higher than the melting point of the highest melting point wax and then placed under strong agitation. The water is preheated to a temperature of about the temperature of the melted wax. The fatty acid and amine are added to the melted wax. Then about one-half of the surfactant is added to the hot wax. The hot water is then added rapidly to the melted wax. A hot wax dispersion is immediately formed and the remaining amount of surfactant is added. The mixture is stirred while cooling to form the wax dispersion. The other ingredients of the paint (rubber latex, air bleeding pigment, water, surfactant) are added to the cooled wax dispersion to form the paint of this invention. It is preferred to add the air bleeding pigment to the mix last.

The paints of this invention are sprayable. Spraying is the preferred method of application of the paints to the inside surface of the tire. The paints of this invention are stable in that they can be stored for long periods of time before being used. If settling occurs, then a minimum of stirring is required to resuspend the ingredients.

In order to further illustrate the present invention, the following Examples are presented.

EXAMPLE I

This Example demonstrates a paint having 25% of the wax as carnauba wax. An inside green tire paint according to this invention was made by first making the wax dispersion. The wax dispersion composition used was as follows:

| INGREDIENT | LBS. WEIGHT |
| --- | --- |
| Paraffin Wax (55° C. M.P.) | 15.57 |
| Paraffin Wax (72° C. M.P.) | 7.78 |
| Carnauba Wax (82° C. M.P.) | 7.78 |
| Oleic Acid | 3.42 |
| Monoethanolamine | 2.10 |
| Surfactant (Triton × 100) | .16 |
| Water | 63.18 |

The waxes were placed in a pot and heated to 95° C., meantime, the water was heated to 95° C. in a separate container. The oleic acid was added to the molten wax and then the monoethanolamine was added. One-half of the surfactant was then added to the wax. The water was then added rapidly to the molten wax. A hot wax dispersion immediately formed. The remaining surfactant was then added to the molten wax dispersion. The mixture was cooled under steady agitation to form the stable wax dispersion.

The paint was made having the following formula:

| INGREDIENT | LBS. WEIGHT |
| --- | --- |
| Wax Dispersion (36.8% Solids) | 285.60 |
| Natural Rubber Latex (62.2% Solids) | 2.03 |
| Water | 6.12 |
| Surfactant (Triton × 100) | 11.76 |
| Mica | 100.00 |

The natural rubber latex, water and surfactant were blended with the wax dispersion. Then the mica was added to the mix and stirred.

The above paint was evaluated as an inside green tire paint by coating the inside of radial passenger and bias truck tires. Several thousand tires containing this paint were vulcanized and no paint related defects were observed. The paint was found to be very effective for slip and release between bladder and tire.

EXAMPLE II

This Example is presented to show that a paint having 6% of the wax as carnauba wax will function satisfactory for passenger tires but will not function properly in tires having long vulcanization times such as truck tires.

The wax dispersion was made similar to that described in Example I except instead of 25 percent of the wax being carnauba, only 6 percent was carnauba. The remaining wax was evenly divided between 55° C. M.P. and 72° C. M.P. paraffin wax.

The paint of this example was evaluated on 10,000 passenger tires and found to be excellent. When the paint was used on truck tires, it was found to be deficient in releasing the tire from the bladder. It is theorized that the more compatible paraffin wax diffused into the tire leaving an insufficient amount of wax remaining to act as a release agent.

The above Examples demonstrate that an effective inside green tire paint can be made without using either silicone or hydrocarbon solvents such as gasoline. The above examples also demonstrate that if the level of carnauba wax is more than 6% but less than 50% of the wax content, then the paint is satisfactory over a broad range of tire sizes and types. When larger or smaller tires are to be vulcanized, a carnauba wax content outside of the 6-50% range may be satisfactory. The optimum wax ratio for a particular tire's paint can be easily determined by one having ordinary skill in the art and access to the teachings of this invention.

The paints of this invention also have an important feature which is not present in the prior art paints. Since the paints are water based, they can be washed off the inside surface of the tire by steam cleaning. This is an important advantage since often the inside surface of a tire will need to be cleaned in order to adhere a repair patch.

Tires which had their interior surface coated with the paints of this invention prior to vulcanization exhibited an improvement in innerliner splice defects. Since the paints of this invention are more compatible with the rubber than are the silicone containing paints, there is much less incidence of defects in the liner splice area of the tire.

In practicing this invention, those skilled in the art may make minor variations in the disclosed novel inside green tire paint without departing from the scope of this invention. Therefore, it is intended that the scope of this invention be limited only by the following claims.

I claim:

1. A method of producing an inside green tire paint which is substantially free of silicone and hydrocarbon solvents, said method comprising (a) heating more than one wax to a temperature above the melting point of the highest melting point wax, (b) adding an amine and a fatty acid to the molten wax, (c) adding a surfactant to the molten wax, (d) adding water which has been preheated to a temperature greater than the melting point of the highest melting point wax, (e) agitating the mixture while cooling to a temperature below the melting point temperature of the lowest melting point wax to form a wax dispersion, (f) blending a rubber latex, water and surfactant with said wax dispersion, and (g) adding a pigment capable of functioning as an air bleeding agent.

2. A method of claim 1 wherein at least one of said waxes is carnauba wax.

3. A method of claim 1 wherein the rubber latex is selected from the group consisting of natural rubber latex and styrene-butadiene latex.

4. A method of claim 2 wherein the pigment capable of functioning as an air bleeding agent is mica.

* * * * *